United States Patent [19]

Staley

[11] Patent Number: 5,454,603

[45] Date of Patent: Oct. 3, 1995

[54] CO-AXIAL HOSE COUPLING ADAPTED FOR REPLACING INNER HOSE UPON RUPTURE THEREOF AND METHOD THEREFOR

[76] Inventor: Colin R. Staley, Jr., 2449-H Bellmont Alamance Rd., Burlington, N.C. 27215

[21] Appl. No.: 141,274

[22] Filed: Oct. 22, 1993

[51] Int. Cl.⁶ ................................................. F16L 55/00
[52] U.S. Cl. ........................ 285/14; 285/16; 285/133.1; 285/138; 29/455.1
[58] Field of Search ................. 285/14, 15, 133.1, 285/16, 138; 29/455.1

[56] References Cited

U.S. PATENT DOCUMENTS

| | | | |
|---|---|---|---|
| 381,670 | 4/1888 | Botsford . | |
| 1,004,151 | 9/1911 | Daniels et al. | 285/14 |
| 1,629,463 | 5/1927 | Haynes . | |
| 2,838,074 | 6/1958 | Lauck | 138/49 |
| 3,297,100 | 1/1967 | Crews | 175/195 |
| 3,485,516 | 12/1969 | Keller | 285/14 |
| 3,820,827 | 6/1974 | Boelkins | 285/133 |
| 3,928,903 | 12/1975 | Richardson et al. | 285/138 X |
| 4,069,842 | 1/1978 | Steydle et al. | 137/595 |
| 4,349,049 | 9/1982 | Silvey | 138/103 |
| 4,411,456 | 10/1983 | Martin | 285/39 |
| 4,422,675 | 12/1983 | Norris et al. | 285/45 |
| 4,423,778 | 1/1984 | Goldsmith | 285/138 X |
| 4,445,332 | 5/1984 | Thies et al. | 60/455 |
| 4,615,545 | 10/1986 | Cruse | 285/24 |
| 4,669,760 | 6/1987 | Hashish et al. | 285/272 |
| 4,871,196 | 10/1989 | Kingsford | 285/138 |
| 5,088,774 | 2/1992 | Spiegelman | 285/133.1 |
| 5,156,190 | 10/1992 | Staley, Jr. | 138/104 |

FOREIGN PATENT DOCUMENTS 2194302  3/1988  United Kingdom ............ 285/138

*Primary Examiner*—Dave W. Arola
*Attorney, Agent, or Firm*—Richard E. Jenkins

[57] ABSTRACT

Provided is a co-axial hydraulic hose assembly having a co-axial hose coupling releasably joining an inner hose and an outer hose of the assembly in a fluidly sealed engagement. The coupling construction comprises an end seal nut that securely fixes each end of the inner hose to each respective end of the outer hose, but which may be removed so that the inner hose may be removed if it has ruptured. Thus, a ruptured inner hose may be removed and replaced with a new inner hose inside of the original outer hose, and then the end seal nut is replaced at each end of the hose assembly to secure the two hoses releasably together in a fluidly sealed engagement, thereby allowing for continued use of the repaired co-axial hose. Optionally, the co-axial hose of the present invention may have a conduit disposed at the bottom end thereof in fluid communication with the annular passageway defined between the outer hose and the inner hose so as to drain fluid from the annular passageway in the event of rupture of the inner hose.

8 Claims, 4 Drawing Sheets

CO-AXIAL HOSE COUPLING ADAPTED FOR REPLACING INNER HOSE UPON RUPTURE THEREOF AND METHOD THEREFOR

TECHNICAL FIELD

The present invention relates, in general, to co-axial tubing, especially hydraulic safety hose. More particularly, the present invention contemplates a co-axial hose having an inner hose inside of an outer hose, wherein the inner hose and outer hose are connected together at opposing ends. Such hoses are used in hydraulic systems such as those utilized by forklift trucks, hydraulic presses, speed boats, automobile transmissions, and the like.

DESCRIPTION OF THE PRIOR ART

Co-axial fluid lines have long been used in industry to deliver various fluids from a source to a point of utilization. They are constructed of inner and outer hoses which are connected together at opposing ends. One aspect of co-axial fluid lines is that they help obviate the problem associated with the rupture of a high pressure hose that consists of only one hose, rather than an inner hose and an outer hose. Such conventional single high pressure hydraulic hoses do not provide any protection to persons in proximity thereto if the hose ruptures. Rupture of the hose can result in oil burns, fire burns, and related injuries associated with the sudden release of hot fluid. Moreover, oil from a ruptured hose employed in a water craft, such as a speedboat could result in pollution of the water surrounding the craft. With a co-axial hose, hot fluid, such as oil, from rupture of the inner hose is trapped by the outer hose. Also, co-axial fluid lines are quite commonly used for the delivery of both oil and air, for instance to power and to lubricate air-driven tools, motors, and the like. Such systems generally include co-axial fluid transmission lines connected from the tool to a manifold block, an injection lubricator, or the like, where the oil and air are introduced from separate sources.

For instance, U.S. Pat. No. 4,349,049 to Silvey discloses a hydraulic hose constructed of an inner hose and an outer hose that are connected at opposing ends with ring clamps. The inner hose and the outer hose define an annular passageway therebetween to receive hydraulic fluid in the event of rupture of the inner hose. A series of lead holes are provided adjacent each end of the outer hose in order to allow the hydraulic fluid to escape under low pressure when such a rupture occurs.

Also of interest is U.S. Pat. No. 3,820,827 to Boelkins. This patent involves a co-axial quick disconnect coupling for co-axial fluid lines, including an external plug-and-socket combination having an internal plug and socket mounted co-axially therein. Valves incorporated in the internal plug-and-socket prevent flow of the fluid in the co-axial line when the assembly is disconnected.

Also of interest is U.S. Pat. No. 5,156,190 to Staley, Jr. This patent involves a unique conduit including a shut-off valve in fluid communication with the annular fluid passageway between the outer hose and the inner hose of a co-axial hydraulic safety hose. The conduit acts to drain fluid from the annular passageway to a suitable remote reservoir in the event of the rupture of the inner hose. The valve may be closed, as desired, to prevent fluid flow through the conduit and to allow for continued emergency use of the hose.

Also of interest are U.S. Pat. No. 4,669,760 to Hashish, et al., U.S. Pat. No. 4,615,545 to Cruse, U.S. Pat. No. 2,838,074 to Lauck, U.S. Pat. No. 4,445,332 to Thies, et al., and U.S. Pat. No. 5,088,774 to Spiegelman, each of which involves a co-axial hose.

The disclosures of all of the above-mentioned patents are incorporated herein by reference.

DISCLOSURE OF THE INVENTION

In accordance with the present invention, applicant provides a co-axial hose coupling suitable for use in a co-axial hydraulic hose assembly, said coupling releasably joining an inner hose and an outer hose of a co-axial hose assembly in a fluidly sealed engagement at each of the two opposing ends thereof. The coupling construction comprises an end seal nut that securely fixes each end of the inner hose to the respective end of the outer hose, but which may be removed so that the inner hose may be removed if it has ruptured. Thus, a ruptured inner hose may be removed and replaced with a new inner hose inside of the original outer hose, and then the end seal nut is replaced at each end of the hose assembly to secure the two hoses releasably together in a fluidly sealed engagement, thereby allowing for continued use of the repaired co-axial hose.

Typically, co-axial hydraulic hoses are disposed in a generally vertical position when utilized. Thus for convenience, the opposing end of the inner and outer hose at the bottom during use is referred to herein as the bottom end or first end. Likewise, the other opposing end of the inner and outer hose which is at the top during use is referred to herein as the top end or second end. It is not intended to limit the invention thereby.

Optionally, there may be disposed at the bottom end a conduit in fluid communication with the annular passageway defined between the outer hose and the inner hose so as to drain fluid from the annular passageway in the event of rupture of the inner hose. As a result, fluid can be drained, whereby mess is avoided and excess pressure is prevented from building against the inside of the outer hose prior to the removal and replacement of the ruptured inner hose with a new inner hose. A suitable conduit for draining fluid may be in accordance with that disclosed in the above-mentioned U.S. Pat. No. 5,156,190 to Staley.

Accordingly, the present invention provides a co-axial hydraulic hose assembly comprising an inner flexible pressure hose for transmitting hydraulic fluid under pressure and an outer flexible pressure hose surrounding and substantially co-extensive in length with said inner hose whereby the inner hose is disposed inside of the outer hose. The outer hose and the inner hose define an annular hydraulic fluid passageway therebetween. Also, the assembly comprises a first and second co-axial hose coupling each having, respectively, a first and second fastening means releasably engaging together the outer hose and the inner hose at opposing ends thereof so as to fluidly terminate said annular passageway. The opposing ends define a first opposing end and a second opposing end, so that the first fastening means releasably engages together the outer hose and the inner hose at the first opposing end and the second fastening means releasably engages together the outer hose and the inner at the second opposing end, whereby the inner hose may be removed and replaced inside of the outer hose.

Also, the present invention provides a method of repairing a co-axial hydraulic hose assembly as described in the above paragraph. The method comprises removing said first and second fastening means, withdrawing the inner hose from out of the outer hose, placing a new inner hose inside of the outer hose, and replacing said first and second fastening means to again engage together the outer hose and the inner hose at the first opposing end and the second opposing end.

Preferably, in the co-axial hydraulic hose assembly and method as described above, the outer hose has inside threads at the first opposing end and at the second opposing end. Also, the inner hose has outside threads at the first opposing end and at the second opposing end. Also, the first and second fastening means comprise first and second end seal nuts, each having outside threads and inside threads. The outside threads of the first and second end seal nuts are in disengagable reciprocating communication, respectively, with the inside threads of the outer hose at the first and second opposing ends, and the inside threads of the first and second end seal nuts are in disengagable reciprocating communication, respectively, with the outside threads of the inner hose at the first and second opposing ends.

Thus, it is a feature of the present invention that maintenance costs can be decreased by replacing only the ruptured inner hose rather than the entire hose assembly. Concomitantly, there is less to be thrown away, which, of course, means less garbage in landfills.

It is therefore the object of the present invention to provide a novel co-axial hose coupling and method therefor, suitable for use in a co-axial hydraulic hose wherein the inner hose may be replaced in the event of a rupture thereof thereby allowing for a repaired co-axial hose to be of continued use.

Some of the objects, advantages, and the like of the present invention having been stated above, other objects will become evident as the description proceeds, when taken in connection with the accompanying drawings as best described below.

BEST MODE FOR CARRYING OUT THE INVENTION

Figure 1:
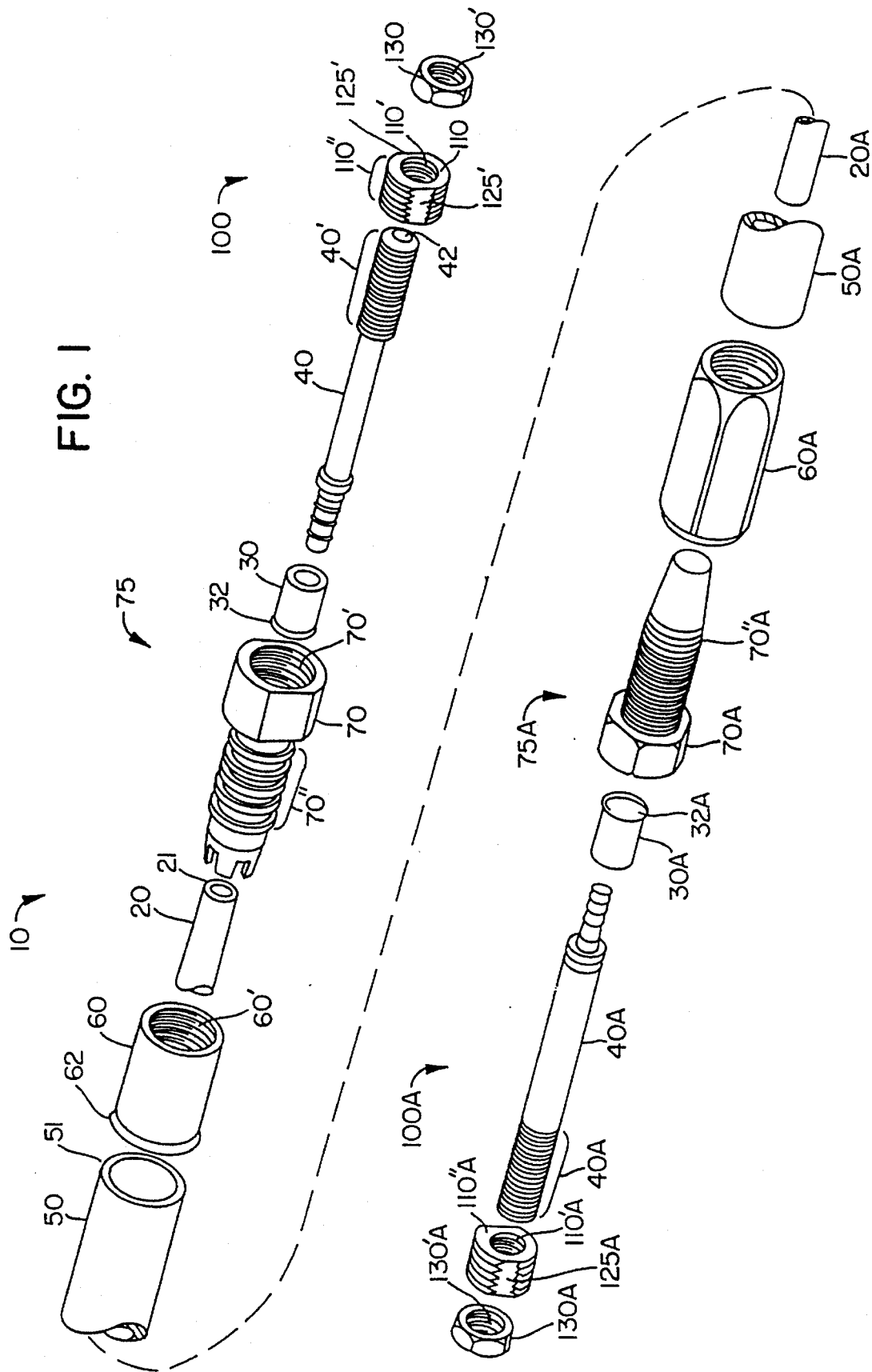
FIG. 1 is an exploded perspective view of the co-axial hydraulic hose assembly in accordance with this invention, broken in the middle and in its disassembled condition.

The same numerals are used in the various drawings to denote the same parts of the assembly.

With reference to FIGS. 1, 2, 3, and 4 of the drawings, generally illustrated is co-axial hydraulic hose assembly 10 of the invention having inner hose 20, 20A and outer hose 50, 50A, defining passageway 74, 74A therebetween and being releasably engaged together, respectively, at a first a opposing end 75 and at a second opposing end 75A thereof. Also at ends 75, 75A, disposed respectively are generally illustrated co-axial hose couplings 100, 100A.

As mentioned above, co-axial hydraulic hoses, when in operation, are usually disposed in a generally vertical position. Thus for convenience, the opposing end disposed at the bottom during use is referred to herein as the bottom end or first end 75. Likewise, the other opposing end which is at the top during use is referred to herein as the top end or second end 75A. It is not intended to limit the invention thereby.

Accordingly, bottom opposing end is first end 75, and bottom or first co-axial hose coupling 100 is disposed at bottom end 75. Likewise, comparable top opposing end is second end 75A, and comparable top or second co-axial hose coupling 100A is disposed at top end 75A. As further discussed below, each of co-axial hose couplings 100, 100A allows said outer hose and said inner hose to be releasably engaged, together at the first opposing end 75 and at the second opposing end 75A.

For simplicity, below are described the parts of bottom opposing end 75 and bottom end hose coupling 100. By referring to FIGS. 1, 2, and 3, the comparable parts of top opposing end 75A and top end hose coupling 100A can be seen designated with the same numerals but with the letter "A". In other words, it is to be understood that the inner hose is designated with two numerals 20, 20A, wherein numeral 20 designates the inner hose as is disposed in bottom or first end 75 and thus numeral 20 corresponds to numeral 20A designating the inner hose as is disposed in top or second end 75A. Likewise, the outer hose is designated with two numerals 50, 50A, wherein numeral 50 designates the outer hose as is disposed in bottom or first end 75 and numeral 50 corresponds to numeral 50A designating the outer hose as is disposed in top or second end 75A, and so on.

Thus, unless indicated as being peculiar to the first end 75, such as a drain conduit 140 disposed in first end 75 as discussed below in connection with FIGS. 3 and 4, whatever is stated with respect to a part in the first end 75 applies likewise to the corresponding part having its numeral denoted with "A" in the second end 75A.

Figure 2:
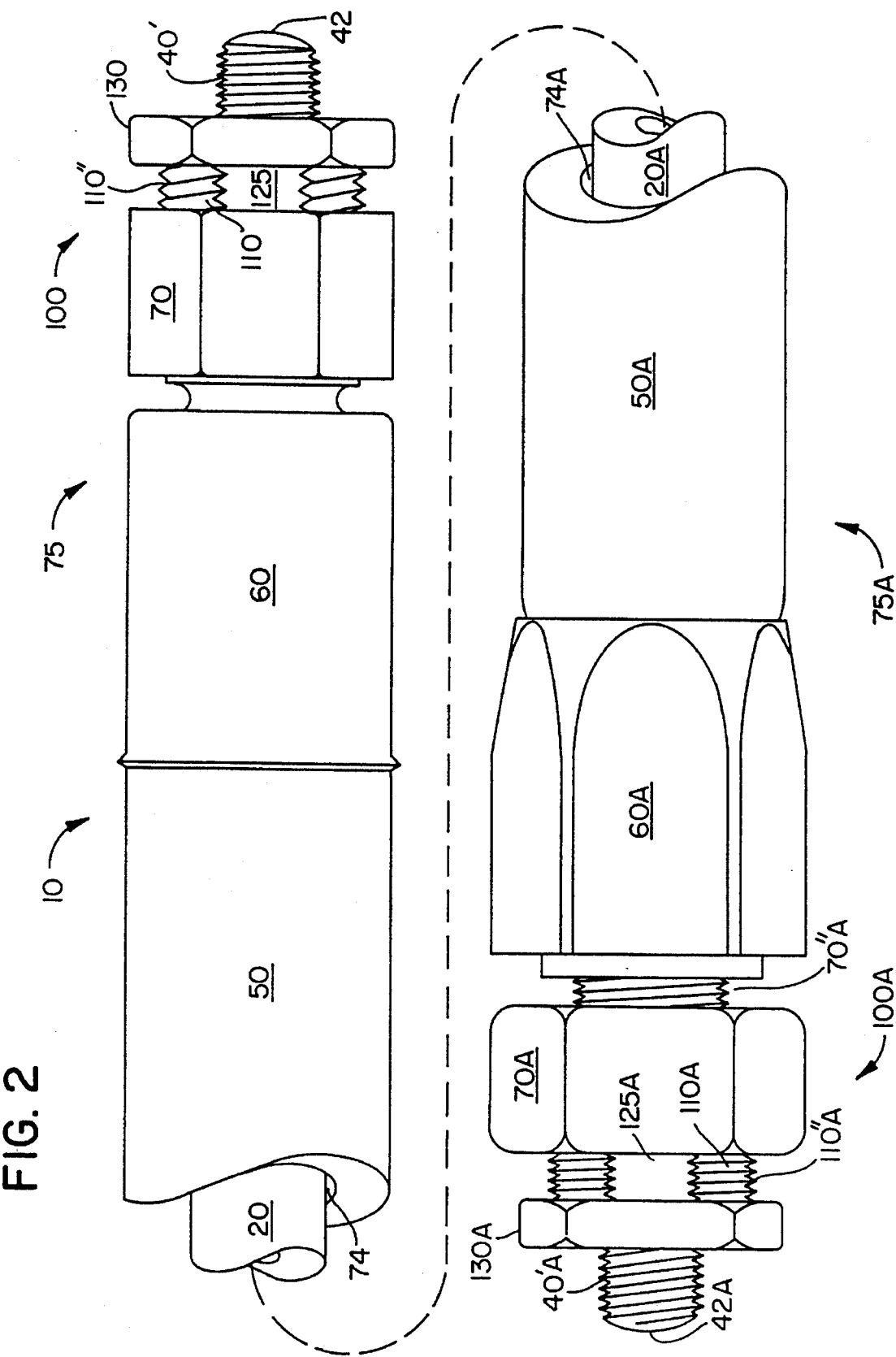
FIG. 2 is a side view of the co-axial hydraulic hose assembly of FIG. 1, but in its assembled condition and broken in the middle to show the relationship of the inner and outer hoses and how they define an annular passageway therebetween.
Figure 3:
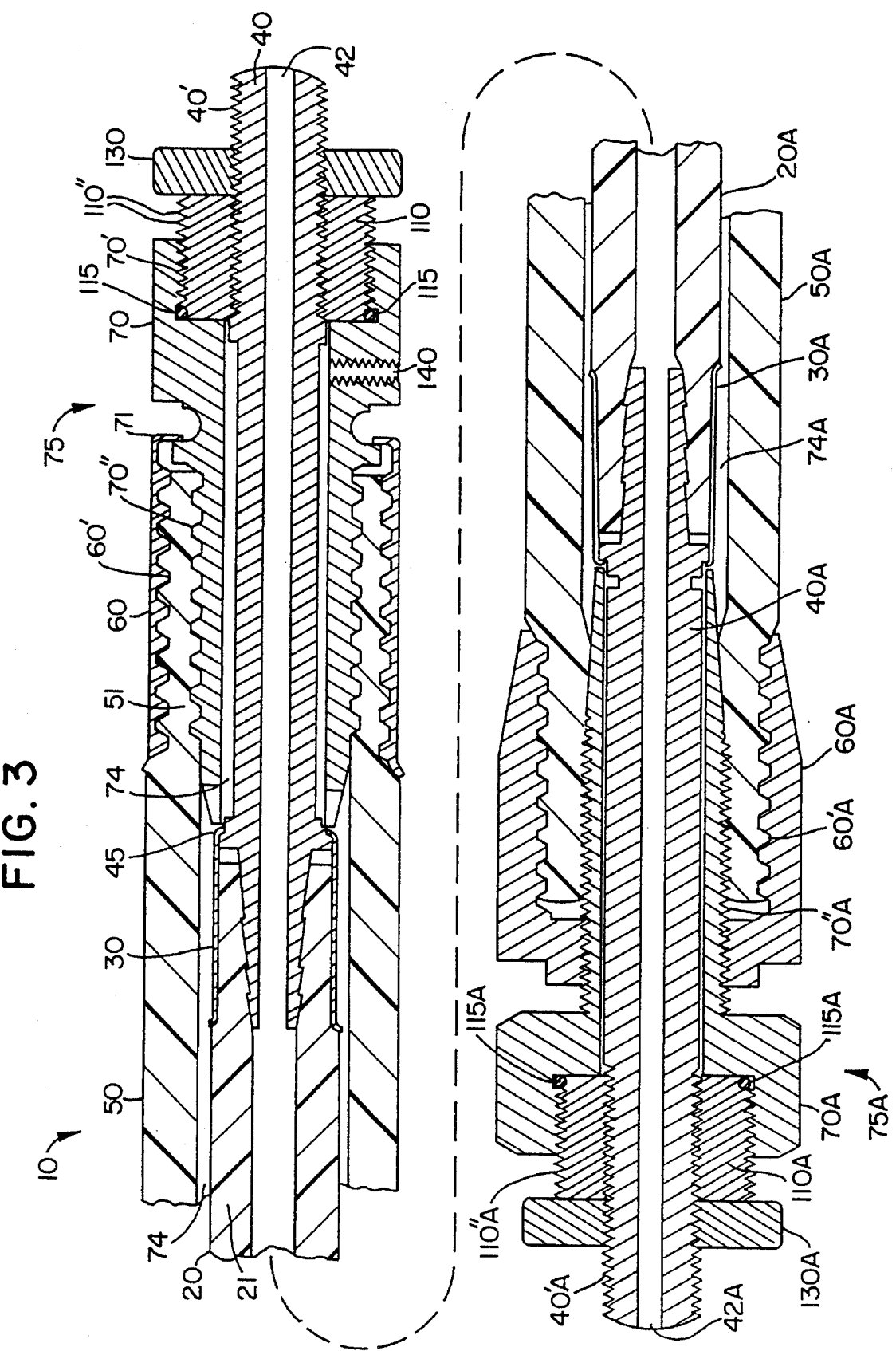
FIG. 3 is a cross-sectional view substantially of the side view of FIG. 2, but is an alternative embodiment that illustrates a slight modification showing an optional drain conduit.

With particular reference to FIGS. 1, 2, and 3, the hose assembly 10 generally has an inner or primary flexible pressure hose 20 for transmitting hydraulic fluid under pressure and an outer or backup flexible pressure hose 50, which may be for transmitting hydraulic fluid under pressure and/or may be for a safety reinforcement in the event of rupture of the inner hose 20. Each of inner hose 20 and outer hose 50 is of generally cylindrical shape. The two hoses 20, 50 are disposed with the inner hose 20 inside of the outer hose 50 and with the outer hose 50 surrounding the inner hose 20. The outer hose 20 and the inner hose 50 are substantially co-extensive in length, defining an annular hydraulic fluid passageway 74, 74A therebetween (seen in FIGS. 2 and 3).

Inner hose 20 has end portion 21. Also, inner hose 20 includes inner sleeve portion 30 and extension portion 40. Inner sleeve 30 is of generally cylindrical shape and optionally has inner sleeve step 32. Inner sleeve 30 is fixedly connected to extension 40 at area 45.

Also, as best seen in FIG. 3, inner hose 20 is forced and thus captured, in the vicinity of end 21 of inner hose 20, between inner sleeve 30 and extension 40. Preferably, glue is used to fixedly secure inner hose 20 between inner sleeve 30 and extension 40.

Extension 40 is of generally cylindrical shape and is threaded with outside threads 40'. The inside of extension 40 provides passageway 42 for a fluid, such as oil, to enter inner hose 20 from a fluid source (not shown) to which extension 40 would be connected when the assembled hose assembly 20 is in operation.

Outer hose 50 has end portion 51. Also, outer hose 50 includes outer sleeve portion 60 and member portion 70. Outer sleeve 60 is of generally cylindrical shape and has disposed on the inside thereof threads 60'. Also, outer sleeve 60 is of generally cylindrical shape and optionally has outer sleeve step 62. Also, outer sleeve 60 is fixedly connected to member 70 at area 71. Member 70 is of generally cylindrical shape and the inside thereof is threaded at one end thereof with inside threads 70'. Also, member 70 is threaded at the other end thereof with outside threads 70".

As best seen in FIG. 3, outer hose 50 is forced and thus captured, in the vicinity of end 51 of outer hose 50, between the inside threads 60' of outer sleeve 60 and the outside threads 70" of member 70. Optionally, glue is used to fixedly secure hose 50 between the inside threads 60' and the outside threads 70".

Hose coupling 100 includes a fastening means, illustrated in the drawings as end seal nut 110. End seal nut 110 is of generally cylindrical shape wherein the inside thereof is threaded with inside threads 110', and also the outside thereof is threaded with outside threads 110". Shown disposed on each side of nut 110 also are optional flat portions 125, 125' to provide a place to engage a wrench when removing nut 110 so as not to strip threads 110" during removal. It is understood that flat portions 125, 125' are not necessary, but rather preferred for facilitating removal of nut 110.

As further described below, end seal nut 110 enables the releasable engagement of the respective opposing ends of the inner hose 20 and the outer hose 50. It is noted that when the hose assembly 10 is assembled so that via end seal nut 110 the respective opposing ends of the outer hose 20 and the inner hose 50 are engaged, they terminate the annular passageway 74, 74A.

As mentioned, the outside of the end of extension 40 is threaded with outside threads 40'. Threads 40' are in reciprocating communication with the inside threads 110' of end seal nut 110 when the hose assembly 10 is assembled, whereby the threaded end of extension 40 of inner hose 20 is disengagably connectable with the inside threads 110' of end seal nut Inside threads 70' of member 70 are in reciprocating communication with the outside threads 110" of end seal nut 110 when hose assembly 10 is assembled for use, whereby member 70 is releasably engaged with nut 110. Preferably, the engagement of member 70 with nut 110 is enhanced with O-ring 115 (seen in FIG. 3) in order to help prevent hydraulic fluid, such as oil, leaking out of assembly 10 during use. Like the inside threads 110' and the outside threads 40', also the inside threads 70' at the end of member 70 and the outside threads 110" of end seal nut 110 are disengagably connectable with one another.

As a result of this configuration, end seal nut 110 can be removed so that extension 40 can be withdrawn. Since inner hose 20 includes sleeve 30 and extension 40, i.e., extension 40 via sleeve 30 is connected to inner hose 20, the result is that inner hose 20 is withdrawn from out of outer hose 50. The assembly could be held vertically so that inner hose 20 will fall out on its own, but typically inner hose 20 would be pulled out by hand. Thus, inner hose 20 can be pulled out from being inside of outer hose 50 in the event of rupture of inner hose Then, the ruptured hose can be replaced with a new inner hose 20, which is connected to an inner sleeve 30 which in turn is connected to extension 40 having a threaded end with outside threads 40', by insertion of new inner hose 20 into the now completely open annular passageway 74, 74A inside of outer hose 50. Then, end seal nut 110 is replaced with its outside threads 110" engaging the inside threads 70' at the end of member 70 and its inside threads 110' engaging the outside threads 40' at the end of extension 40.

To assist in keeping end seal nut 110 in place, also shown is optional lock nut 130. Lock nut 130 is of generally cylindrical shape and has a threaded bore hole with the threads 130' thereof in reciprocating communication with the outside threads 40' of extension 40.

Figure 4:
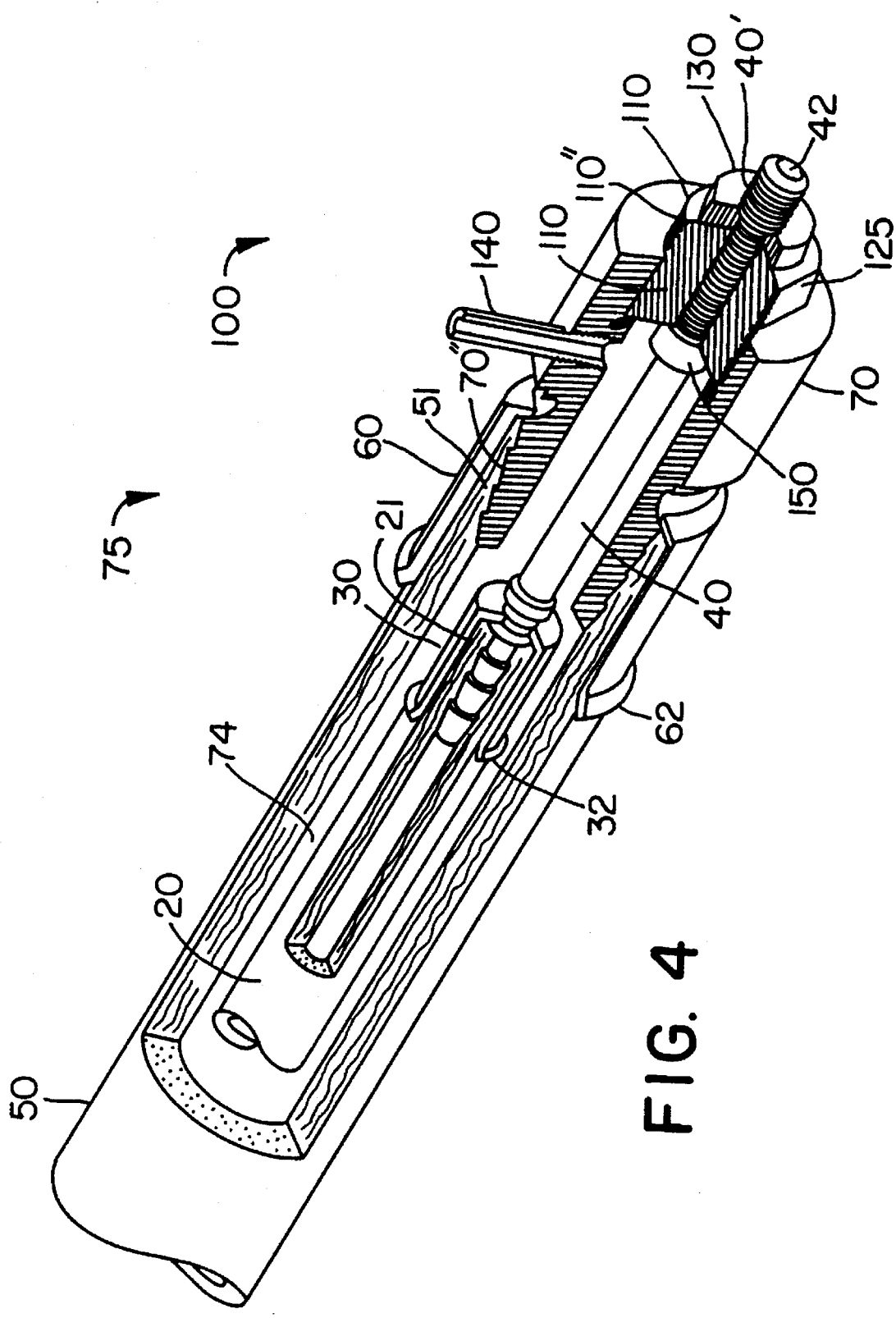
FIG. 4 is a cutaway perspective view similar to the bottom or first end portion of the co-axial hydraulic hose assembly in FIG. 3 showing the optional drain conduit, but is an alternative embodiment showing a thread-free sleeve that connects to the outer hose.

With particular reference to FIGS. 3 and 4, shown is an alternative embodiment having optional conduit 140 in fluid communication with annular passageway 74, 74A and disposed at bottom end 75 of assembly 10. Preferably, conduit 140 goes through member 70 to reach passageway 74. If inner hose 20 ruptures, annular passageway 74 will fill with hydraulic fluid. Conduit 140 provides a convenient means for draining this fluid to avoid buildup of excess pressure on the inside of outer hose 50. Also, draining this fluid, prior to removing nut 110 in order to remove ruptured inner hose 20, avoids the mess of fluid coming out as ruptured inner hose 20 is removed. To keep annular passageway 74 sealed during use of assembly 10, conduit 140 is provided with a removable cap or shut off valve (not shown).

With particular reference to FIG. 4, the alternative embodiment illustrated therein has two more features different from those illustrated in FIGS. 1, 2, and 3. More particularly in FIG. 4 is shown optional abutting stop 150 disposed toward the middle of extension 40. Stop 150 abuts against end seal nut 110 when the hose assembly 10 is completely assembled in order to help prevent any fluid from leaking out of annular passageway 74 when hose assembly 10 is in operation. Also shown in FIG. 4 is that outer sleeve 60 does not have disposed on the inside thereof threads 60'. Rather, outer sleeve 60 is thread-free. Therefore, outer sleeve 60 crimps the end 51 of outer hose 50 to outside threads 70" of member 70. Preferably, glue is used to fixedly secure hose 50 between sleeve 60 and outside threads 70".

It will be understood that various details of the invention may be changed without departing from the scope of the invention. Furthermore, the foregoing description is for the purpose of illustration only, and not for the purpose of limitation—the invention being defined by the claims.

What is claimed is:

1. A co-axial hydraulic hose assembly comprising:

(A) an inner flexible pressure hose for transmitting hydraulic fluid under pressure;

(B) an outer flexible pressure hose surrounding and substantially co-extensive in length with said inner hose whereby said inner hose is disposed inside of said outer hose, said outer hose and said inner hose defining an annular hydraulic fluid passageway therebetween; and (C) a first and second co-axial hose coupling each having, respectively, a first and second fastening means releasably engaging together said outer hose and said inner hose at opposing ends thereof so as to fluidly terminate said annular passageway, wherein:

(i) said opposing ends define a first opposing end and a second opposing end, so that said first fastening means releasably engages together the outer hose and the inner hose at the first opposing end and said second fastening means releasably engages together the outer hose and the inner hose at the second opposing end, (ii) said outer hose has means providing inside thread at the first opposing end and at the second opposing end, (iii) said inner hose has means providing outside thread at the first opposing end and at the second opposing end, (iv) said first and second fastening means comprise first and second end seal nuts each having outside threads and inside threads, (v) said outside threads of the first and second end seal nuts are in rotatably disengagable relationship, respectively, with said inside thread of the outer hose at the first and second opposing ends, and (vi) said inside threads of the first and second end seal nuts are in rotatably disengagable relationship, respectively, with said outside thread of the inner hose at the first and second opposing ends, whereby said inner hose may be removed and replaced inside of said outer hose.

2. The co-axial hydraulic hose assembly of claim 1, wherein said outer hose is for transmitting hydraulic fluid under pressure.

3. The co-axial hydraulic hose assembly of claim 1, wherein said outer hose is for a safety reinforcement in the event of rupture of the inner hose.

4. The co-axial hydraulic hose assembly of claim 1, including a drain conduit disposed at said first opposing end and in fluid communication with said annular passageway.

5. A method of repairing a co-axial hydraulic hose assembly, said assembly including (a) an inner flexible pressure hose for transmitting hydraulic fluid under pressure, (b) an outer flexible pressure hose surrounding and substantially co-extensive in length with said inner hose whereby said inner hose is disposed inside of said outer hose, said outer hose and said inner hose defining an annular hydraulic fluid passageway therebetween, and (c) a first and second co-axial hose coupling each having, respectively, a first and second fastening means releasably engaging together said outer hose and said inner hose at opposing ends thereof so as to fluidly terminate said annular passageway, wherein said opposing ends define a first opposing end and a second opposing end, so that said first fastening means releasably engages together the outer hose and the inner hose at the first opposing end and said second fastening means releasably engages together the outer hose and the inner hose at the second opposing end, and wherein:

(i) said first and second fastening means comprise first and second end seal nuts each having outside threads and inside threads, (ii) the outer hose has means providing inside thread at the first opposing end and at the second opposing end, (iii) the inner hose has means providing outside thread at the first opposing end and at the second opposing end, and (iv) the outside threads of the first and second end seal nuts are in rotatably disengagable relationship, respectively, with the inside thread of the outer hose at the first and second opposing ends, and the inside threads of the first and second end seal nuts are in rotatably disengagable relationship, respectively, with the outside thread of the inner hose at the first and second opposing ends, said method comprising:

(A) removing said first and second fastening means, and wherein said removing of said first and second fastening means comprises rotatably disengaging the outside threads of the first and second end seal nuts from the inside thread of the outer hose at the first and second opposing ends and rotatably disengaging the inside threads of the first and second end seal nuts from the outside thread of the inner hose at the first and second opposing ends;

(B) withdrawing the inner hose from out of the outer hose;

(C) placing a new inner hose inside of the outer hose, and the new inner hose having means providing outside thread at first and second opposing ends thereof; and (D) replacing said first and second fastening means by rotatably engaging together the outside threads of the first and second end seal nuts with the inside thread of the outer hose at the first and second opposing ends and by rotatably engaging together the inside threads of the first and second end seal nuts with the outside thread of the new inner hose at the first opposing end and the second opposing ends.

6. The method of claim 5, wherein said placing of a new inner hose inside of the outer hose comprises placing a new inner hose inside of an outer hose that is for transmitting hydraulic fluid under pressure.

7. The method of claim 5, wherein said placing of a new inner hose inside of the outer hose comprises placing a new inner hose inside of an outer hose that is for a safety reinforcement in the event of rupture of the inner hose.

8. The method of claim 5, including providing a drain conduit disposed at said first opposing end and in fluid communication with said annular passageway.

* * * * *